(12) United States Patent
Prigent et al.

(10) Patent No.: US 9,188,004 B2
(45) Date of Patent: Nov. 17, 2015

(54) DESYNCHRONIZED COUPLING OF A HYDRAULIC MACHINE

(71) Applicants: Andre Prigent, Verberie (FR); Julien Lambey, Verberie (FR)

(72) Inventors: Andre Prigent, Verberie (FR); Julien Lambey, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 362 days.

(21) Appl. No.: 13/753,435

(22) Filed: Jan. 29, 2013

(65) Prior Publication Data

US 2013/0195704 A1      Aug. 1, 2013

(30) Foreign Application Priority Data

Jan. 30, 2012   (FR) ...................................... 12 50849

(51) Int. Cl.
*F01C 1/04* (2006.01)
*F16H 61/4035* (2010.01)
*F16H 61/4183* (2010.01)

(52) U.S. Cl.
CPC .............. *F01C 1/04* (2013.01); *F16H 61/4035* (2013.01); *F16H 61/4183* (2013.01)

(58) Field of Classification Search
CPC ......................... F16H 61/4035; F16H 61/4183
USPC ..................................... 60/413, 459, 468, 494
See application file for complete search history.

(56) References Cited

U.S. PATENT DOCUMENTS

| 8,857,172 | B2 * | 10/2014 | Prigent et al. .................. 60/488 |
| 2009/0241530 | A1 * | 10/2009 | Rampen et al. ................. 60/459 |
| 2012/0117958 | A1 * | 5/2012 | Caldwell et al. ............... 60/327 |

FOREIGN PATENT DOCUMENTS

| EP | 2241530 A1 | 10/2010 |
| FR | 2784335 A1 | 4/2000 |
| FR | 2958886 A1 | 10/2011 |

* cited by examiner

*Primary Examiner* — Thomas E Lazo
(74) *Attorney, Agent, or Firm* — Blakely Sokoloff Taylor & Zafman LLP

(57) ABSTRACT

A hydraulic circuit. The circuit includes a high pressure line and a low pressure line, the pressure in the high pressure line being greater than the pressure in the low pressure line, a hydraulic machine having two ports designed to be connected to the high pressure and low pressure lines, a first of the ports being a hydraulic fluid intake port and the second of the ports being a hydraulic fluid discharge port The circuit includes a sequential connector designed to connect the ports of the hydraulic machine to the high and low pressure lines.

8 Claims, 5 Drawing Sheets

DESYNCHRONIZED COUPLING OF A HYDRAULIC MACHINE

The present invention relates to hydraulic circuits comprising a pump and/or a hydraulic motor, and applies more particularly to transmissions equipped with an additional hydraulic transmission, wherein the pump or the hydraulic motor must be engaged during its rotation.

PRIOR ART

Hybrid vehicles are known that are equipped with a main, mechanical transmission and with an additional hydraulic transmission which is activated under particular conditions of the vehicle's use.

In the present text, the use of the term hydraulic machine will designate a machine that is able to operate as a motor or as a hydraulic pump, and which is for example controlled by means of the tilt of a swash plate of said hydraulic machine. A hydraulic machine conventionally includes a plurality of pistons located in cavities and performing reciprocating motions in contact with a cam.

FIG. 1 shows one example of a hydraulic machine, in this case a hydraulic motor 2 supplied with pressure by a hydraulic pump 1.

In order to illustrate its operation, the direction of circulation of the fluid is shown by arrows; and a high pressure line HP is thus defined connecting a first port 11, or discharge of the hydraulic pump 1, to a first port 21 or intake of the hydraulic motor 2, and a low pressure line BP connecting a second port 22 or discharge of the hydraulic motor 2, to a second port 12 or intake of the hydraulic pump 1. It will be clearly understood that in the case of a reversible hydraulic machine, operation in reverse is also possible.

The hydraulic motor 2 as shown including a housing 23, a cam 24, a rotor 25 having a plurality of cavities 26 wherein a plurality of pistons 27 are located, said pistons being arranged radially here relative to the axis of rotation of the rotor 25.

The rotor 25 is associated with supply lines provided in a distributor that is fixed with respect to the housing 23 and to the cam 24, respectively connected to the first port 21 and to the second port 22 of the hydraulic motor 2. They will be designated respectively as the high pressure line 28 and low pressure line 29. Each of these line exhibits a plurality of channels designed to be connected to the cavities 26 of the rotor 25. Also known are motors having a rotating housing, operating according to a similar principle.

In order to illustrate an operating mode of the hydraulic machine, the direction of rotation of the rotor 25 is shown in FIG. 1 by an arrow in FIG. 1, said rotation putting the cavities 26 into alignment with the high pressure 28 or lower pressure 29 lines of the distributor, which causes the pistons 27 to respectively move out of their cavity 28, or to move back into it, while still remaining in contact with the cam 24, and corresponds to the profile of the cam 24 so that the pistons 27 are held in contact with the cam 24. In the case of a reversible motor, operation in reverse is also possible.

More precisely, the cam 24 exhibits peaks and valleys, the peaks corresponding to the position wherein the pistons 27 accomplish a minimum movement from their cavity 28 while the valleys correspond to the position wherein the pistons 27 accomplish a maximum movement from their cavity 28. The cam portion extending from a peak to a valley is the portion corresponding to an emergence of the pistons 27 under the influence of supply from a high pressure line 28, while the cam portion extending from a valley to a peak is the cam portion corresponding to a return of the pistons 27, hence to expulsion of fluid through the low pressure line 29.

Hydraulic machines having a free wheel configuration are known, that is to say a configuration wherein the hydraulic machine operates without fluid pressure and where the pistons are not in contact with the cam, such a configuration being advantageous for example on equipment having mixed working conditions. Opposite to this free wheel condition is the working condition wherein the pistons are in contact with the cam and the hydraulic machine operates with fluid pressure.

The additional hydraulic transmission thus typically includes a hydraulic machine which is in the free wheel configuration when the additional hydraulic transmission is not activated, and switches to the working configuration when it is activated.

This transition from the free wheel configuration to the working configuration is accomplished by emergence of the pistons, which are brought into contact with the cam, or more precisely their free ends are brought into contact with the cam. This transition from the free wheel configuration to the working configuration is commonly called coupling.

This emergence of the pistons must however take place under specific conditions, in order not to damage the hydraulic machine, and more particularly degrade the free ends of the piston and the cam.

In prior systems, it is necessary to reduce considerably, or even to stop the engine of the main transmission of the vehicle before activating the additional hydraulic transmission, and hence switching the hydraulic machine into working configuration, in order to avoid such a degradation of the hydraulic machine, which is constraining when using these systems.

Improvements have been applied to such systems, in order to allow transition from the free wheel configuration to the working configuration of the hydraulic machine under better conditions, for example in document FR 2784335.

This document presents a system achieving transition from the free wheel configuration to the working configuration in several steps, including:
 an initiation phase wherein the housing of the hydraulic machine is put under pressure by a hydraulic pump, while the two ports of the hydraulic machine are subjected to one and the same pressure, lower than said pressure in the housing, then
 an engagement phase wherein, first, the two ports of the hydraulic machine are connected to the intake and discharge of a hydraulic pump, then secondly the housing of the hydraulic machine is put under ambient pressure.

Such a system, though allowing relaxation of the conditions required for transition to the working configuration of the hydraulic machine, does not allow precise control of the emergence of the pistons, which can work well at a certain operating point but can cause a noisy coupling at other rolling speeds. This solution also causes considerable temporary pressure rises in the housing of the motors during the coupling phase.

Document FR 2958886 presents an improved system allowing accomplishment of transition from the free wheel configuration to the working configuration by applying pressure in the housing of the motor. Such a system, however, is constraining in that it necessitates a dedicated pump and exhibits a single operating point with a given pressure and speed. It is therefore necessary to have matched control of the dedicated hydraulic pump, and such a system cannot function in the case of a pump connected to a main transmission of a vehicle.

The invention therefore aims to propose a system allowing progressive and silent coupling of a hydraulic machine, fed by means which can not be specifically controlled, for example a fixed displacement pump, a variable displacement pump connected to a transmission, or accumulators.

PRESENTATION OF THE INVENTION

The present invention aims to propose a system not exhibiting such disadvantages, and proposes a hydraulic circuit including:
- a high pressure line and a low pressure line, the pressure in said high pressure line being greater than the pressure in said low pressure line,
- a hydraulic machine having two ports designed to be connected to said high pressure and low pressure lines, a first of said ports being a hydraulic fluid intake port and the second of said ports being a hydraulic fluid discharge port, said circuit being characterized in that it includes sequential connection means, designed to sequentially connect said ports of the hydraulic machine to said high and low pressure lines.

According to a particular embodiment, said circuit also includes a reservoir at ambient pressure, wherein said connection means include at least one selector valve designed to selectively connect said intake and discharge ports of said hydraulic machine
- to the high and low pressure lines,
- to the reservoir.

According to another particular embodiment, said hydraulic machine is a radial piston hydraulic machine, and said sequential connection means include at least one distributor designed to, during a first movement, connect the intake of said hydraulic machine to the high pressure line, and the discharge of said hydraulic machine to the low pressure line.

The circuit then also typically includes a control line, the pressure whereof is lower than the pressure in the low pressure line, and wherein the connection means are also designed to selectively connect said ports of said hydraulic machine to the control line.

According to a first variant, said high and low pressure are respectively connected to the discharge and to the intake of a hydraulic pump and the control line is fed by a control pump, said connection means including
- connection means of the hydraulic machine, and
- a intake distributor, the intake distributor being designed to selectively connect the control pump or the intake and the discharge of the hydraulic pump to the connection means of the hydraulic machine,
said connection means of the hydraulic machine being designed to selectively connect the intake and the discharge of said hydraulic machine to the intake distributor or to a reservoir at ambient pressure.

According to a second variant, said high pressure line is connected to a high pressure accumulator and said low pressure line is connected to a low pressure accumulator, and the control line is fed by a control accumulator, said connection means including
- connections means of the hydraulic machine, and
- a intake distributor, the intake distributor being designed to selectively connect said high pressure and low pressure accumulators or the control accumulator to the connection means of the hydraulic machine,
said connection means of the hydraulic machine being designed to selectively connect the intake and discharge of said hydraulic machine to the intake distributor or to a reservoir at ambient pressure.

According to a particular embodiment of these variants, said connection means of the hydraulic machine include a first and a second distributor,
- said first distributor being designed to, in a first configuration, connect the intake of the hydraulic machine to a reservoir at ambient pressure and, in a second configuration, to connect the intake of the hydraulic machine to the intake distributor,
- said second distributor being designed, in a first configuration, to connect the discharge of the hydraulic machine to a reservoir at ambient pressure, and in a second configuration to connect the discharge of the hydraulic machine to the intake distributor.

According to another particular embodiment of said variants, said connection means include a distributor designed,
- in a first configuration, to connect the intake and the discharge of said hydraulic machine to a reservoir at ambient pressure,
- in a second configuration, to connect the intake of said hydraulic machine to the intake distributor, and the discharge of said hydraulic machine to a reservoir at ambient pressure,
- in a third configuration, to connect the intake of said hydraulic machine to the intake distributor and the discharge of said hydraulic machine to said intake distributor.

The invention also relates to a control method for a radial piston hydraulic machine, said method including the following steps:
- putting the intake of the hydraulic machine under a first pressure,
- execution of a time delay corresponding to a portion of a revolution of said hydraulic machine,
- putting the discharge of the hydraulic machine under a second pressure, lower than or equal to said first pressure.

This method typically includes a step consisting of putting the intake and the discharge of the hydraulic machine under distinct pressures, and wherein, for a hydraulic machine including a rotor and a cam having n peaks, said time delay is designed to allow all the pistons to move outward from their cavities.

The invention thus makes it possible to obtain progressive coupling, the impact whereof on the lifetime of the hydraulic machine is sharply reduced, and which is also more silent, without requiring a pump or a dedicated pressure supply means.

PRESENTATION OF THE FIGURES

Other features, aims and advantages of the invention will be revealed by the description that follows, which is purely illustrative and not limiting, and which must be read with reference to the appended drawings, wherein:

FIG. 1 described previously, illustrates an example of a section view of a radial pistons hydraulic machine;

In all the figures, identical elements are designated with the same numerical references.

DETAILED DESCRIPTION

Figure 2:
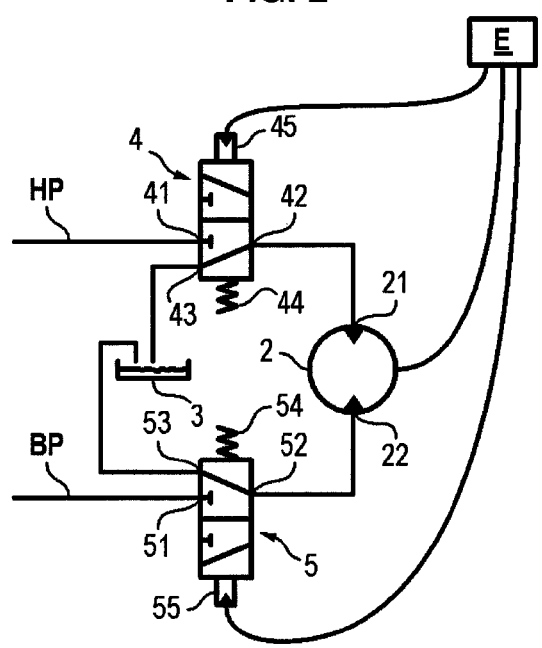
FIG. 2 shows an example of a hydraulic circuit according to one aspect of the invention.

FIG. 2 illustrates schematically an example of a hydraulic circuit according to one aspect of the invention.

The hydraulic circuit shown includes a high pressure line HP, a low pressure line BP, a hydraulic motor 2 and a reservoir 3. It is clearly understood that the invention is not limited to a hydraulic circuit having only a single hydraulic motor, and applies particularly to assistance circuits including one or more hydraulic motors.

Figure 1:
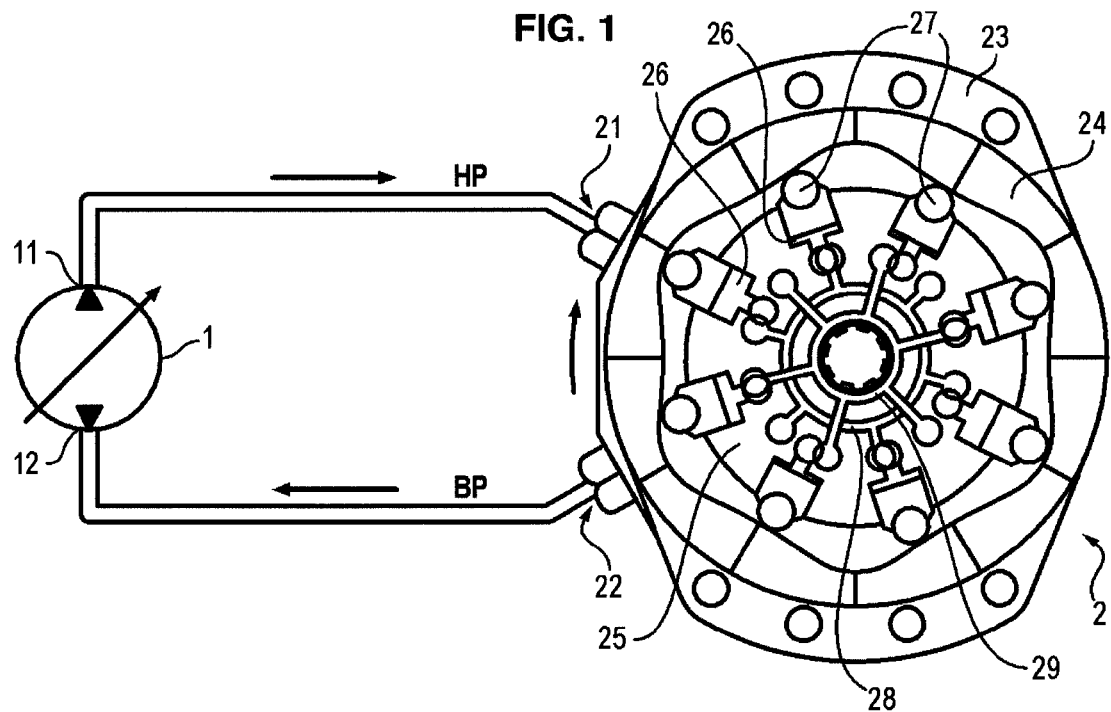

The hydraulic motor 2 is typically a radial piston hydraulic motor, such motors being well known in the prior art and illustrated in FIG. 1, described previously. For the remainder of the description and in order to illustrate the operation of the invention, we will refer to a hydraulic motor such as that presented in FIG. 1. More generally, the invention applies to systems that need to be coupled. The hydraulic motor 2 includes two ports; a first port 11 and a second port 12 allowing intake and discharge of the fluid, respectively.

In the embodiment shown, wherein the first port 21 is connected to the high pressure line HP and the second port 22 is connected to the low pressure line BP, the first port 21 corresponds to the intake of the hydraulic motor 2, while its second port 22 corresponds to its discharge.

Operation in reverse is also possible by reversing the high pressure HP and low pressure BP lines according to the same principle as the operation described hereafter.

It is clearly understood here that the term "high pressure" and the term "low pressure" are relative designations; the high pressure line HP is a line of the hydraulic circuit wherein the pressure is higher than the pressure in the low pressure line BP.

The circuit as shown includes two distributors, 4 and 5, making it possible to selectively connect, respectively:
- the first port 21 of the motor 2 to the high pressure line HP or to the reservoir 3; and
- the second orifice 22 of the motor 2 to the low pressure line BP or to the reservoir 3.

In the embodiment shown, each of the distributors 4 and 5 respectively includes:
- a first port, respectively 41 and 51, connected respectively to the high pressure line HP and to the low pressure line BP,
- a second port, respectively 42 and 52, connected respectively to the first port 21 and to the second port 22 of the motor 2,
- a third port, respectively 43 and 53, connected to the reservoir 3.

Each of the distributors 4 and 5 alternates between two configurations:
- a first configuration wherein the first port 41 or 51 is blocked while the second 42 or 52 is connected to the third port 43 or 53, and
- a second configuration wherein the first port 41 or 51 is connected to the second port 42 or 52, while the third port 43 or 53 is blocked.

The distributors 4 and 5 are equipped with means allowing control of their movement between these two configurations, namely a return means, respectively 44 and 54, typically elastic return means or an electric or hydraulic control, and a control, respectively 45 and 55, typically hydraulic or electric. In the embodiment shown, the controls 45 and 55 are hydraulic controls, and the elastic return means are springs 44 and 54, which by default (that is, in the absence of application of a force by the controls 45 and 55) hold said distributors in their first configuration as described above.

The controls 45 and 55 make it possible to respectively move the distributors 4 and 5 from their first toward their second configuration.

The hydraulic motor 2 is initially connected to the reservoir 3 via its two ports 21 and 22. The hydraulic motor 2 is then in the free wheel configuration; its pistons are in the "retracted" position and do not come into contact with the cam.

If we wish to activate the hydraulic motor 2, as for example in the case of hydraulic assistance, we will couple it, which means that its pistons are made to emerge from their cavities in order for them to come into contact with the cam.

Firstly, the first distributor 4 is controlled by means of its control 45 so as to connect the first port 21 of the hydraulic motor 2 to the high pressure line HP of the hydraulic circuit shown.

Thus connecting the first port 21 of the hydraulic motor 2 to the high pressure line HP causes gradual emergence of the pistons of the hydraulic motor 2 as they are pushed by a high pressure.

Thus, referring to the circuit according to one aspect of the invention as shown in FIG. 2, starting with an initial free wheel configuration of a hydraulic motor 2, that is a configuration wherein the pistons 27 are retracted into their cavities 26, by connecting in a first step the first port 21 of the hydraulic motor 2 to the high pressure line HP by means of the distributor 4, while the second port 22 of the hydraulic motor 2 is connected to a reservoir at atmospheric pressure, only the pistons 27 the cavity 26 whereof is connected to the high pressure passage 28 emerge from their cavity 26.

Thus, upon connection of the high pressure line HP, only a portion of the pistons emerge from their cavity.

Advantageously, the channels of the high pressure passage 28 designed to be connected to the cavities 26 of the rotor 25 are arranged substantially so that their opening begins opposite the peaks of the cam 24, and therefore in positions wherein the movement of the pistons 27 from their retracted position until contact with the cam 24 is reduced, thus limiting the force of the impact during this contacting of the pistons 27 and the cam 24, and consequently the wear of the pistons 27 and of the cam 24, as well as the noise caused by that contacting. Thus a first set of pistons is fed for the first time.

Thereafter, other pistons are sequentially fed for the first time; the rotation of the rotor 25 progressively connects the cavities 26 wherein the remaining pistons 27 are positioned to the high pressure passage 28, causing their gradual emergence as the rotor 25 rotates.

After a time delay, which corresponds to a portion of a revolution performed by the rotor 25, the second port 22 of the hydraulic motor 2 is connected to the second port 12 of the hydraulic pump 1 by means of the second distributor 5, that is to say the low pressure line BP.

The connection of the intake 21 and the discharge 22 of the hydraulic machine 2, here a hydraulic motor, is therefore accomplished sequentially via two successive movements of the connection means 4 and 5.

This time delay is typically accomplished by a control unit E, such as a calculator, which is advantageously designed to determine said time delay according to the characteristics of the hydraulic motor 2 and of its rotation speed, so as to allow all the pistons 27 to emerge from their cavities 26.

A progressive emergence of the pistons 27 is thus accomplished, that is a progressive coupling of the hydraulic motor 2. Indeed, the emergence of the pistons 27 and their contacting with the cam 24 is accomplished progressively in that only a portion of the pistons 27 is put into contact with the cam 24 during the connection of the intake 21 of the hydraulic motor 2 to the high pressure line HP, and the remaining pistons 27 are put into contact with the cam 24 progressively, according to the rotation of the rotor 25. Furthermore, the coupling is also progressive in that the discharge 22 of the hydraulic motor 2 is initially connected to the reservoir 3 at ambient or atmospheric pressure, and the return of the pistons 27 upon moving between a valley and a peak of the cam 24 therefore occurs without impact.

Figure 3:
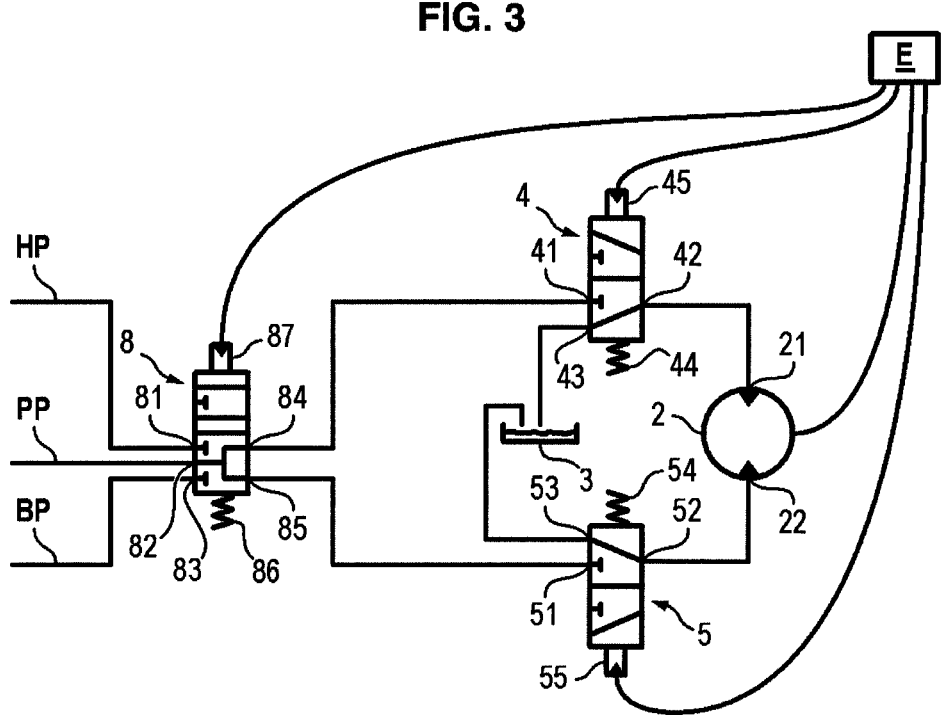
FIGS. 3 to 7 show variants and particular applications according to the invention of the hydraulic circuit shown in FIG. 2.

FIG. 3 shows a variant of the hydraulic circuit of FIG. 2.

In this embodiment, the circuit also includes a control line PP, the control pressure whereof is less than or equal to the pressure in the lower pressure line BP.

The common elements with FIG. 2 are labeled with the same numerical references, and will not be taken up in detail here.

In this embodiment, an intake distributor 8 provides the connection between the high pressure, low pressure and control lines HP, BP and PP on the one hand, and the first ports 41 and 51 of the distributors 4 and 5, on the other.

More precisely, the intake distributor 8 includes:
a first port 81 connected to the high pressure line HP,
a second port 82 connected to the control line PP,
a third port 83 connected to the low pressure line BP,
a fourth port 84 connected to the first port 41 of the distributor 4,
a fifth port 85 connected to the first port 51 of the distributor 5.

This distributor 8 is controlled by a control 87 opposed by an elastic means 86, so as to alternate between two configurations:
a first configuration wherein the first port 81 and the third port 83 are blocked, while the second port 82 is connected to the fourth port 84 and to the fifth port 85, and
a second configuration wherein the first port 81 is connected to the fourth port 84, the second port 82 is blocked and the third port 83 is connected to the fifth port 85.

Consequently, in its first configuration, the distributor 8 connects the control line PP to the first ports 41 and 51 of the distributors 4 and 5. In its second configuration, the distributor 8 connects the first port 41 of the distributor 4 to the high pressure line HP, and the first port 51 of the distributor 5 to the low pressure line BP.

The distributor 8 is held by default in its first configuration due to the action of the elastic means 86, and the control 87 is designed to move it toward its second configuration.

In operation, the hydraulic motor 2 is by default in a free wheel configuration, and its two ports are connected to the reservoir 3.

During a first step, the movement of the distributor 4 is controlled so as to connect the intake 21 of the hydraulic motor 2 to the fourth port 84 of the distributor 8, which therefore connects the intake 21 of the hydraulic motor 2 to the control line PP.

The intake 21 of the hydraulic motor is thus connected to the control line PP, while its discharge 22 is connected to the reservoir 3 at ambient or atmospheric pressure.

This causes the emergence of the pistons 27 from their cavities 26 due to this pressure in the control line PP which is applied in the cavities 26 connected to the high pressure passage 28.

During a second step, which is accomplished after a first time delay has been performed following the first step, the movement of the distributor 5 is controlled so as to connect the discharge of the hydraulic motor 2 to the fifth port 85 of the distributor 8, which therefore connects the discharge 22 of the hydraulic motor 2 to the control line PP.

The machinery is therefore in "bypass" mode; the motor aspirates what it discharges at an identical pressure at intake and discharge, and does not generate any torque.

Finally, during a third step, which is accomplished after a second time delay has been performed following the second step, the movement of the distributor 8 is controlled so as to connect the high pressure line HP and the low pressure line BP respectively to the intake 21 and to the discharge 22 of the hydraulic motor 2, so as to cause the hydraulic motor 2 to switch into its working configuration.

Compared with the operation of the embodiment shown in FIG. 2, the operation of this particular embodiment therefore incorporates an additional step in that the intake 21 and the discharge 22 of the hydraulic motor 2 are firstly connected to the control line PP before being connected to the high pressure HP and low pressure BP lines, which allows coupling of the hydraulic motor 2 without being influenced by the pressure levels in the high and low pressure lines HP and BP, and therefore makes it possible to avoid any risk of collapsing the pressure in the HP and BP lines, or generating too violent an emergence of the pistons in the event of high pressure.

Figure 4:
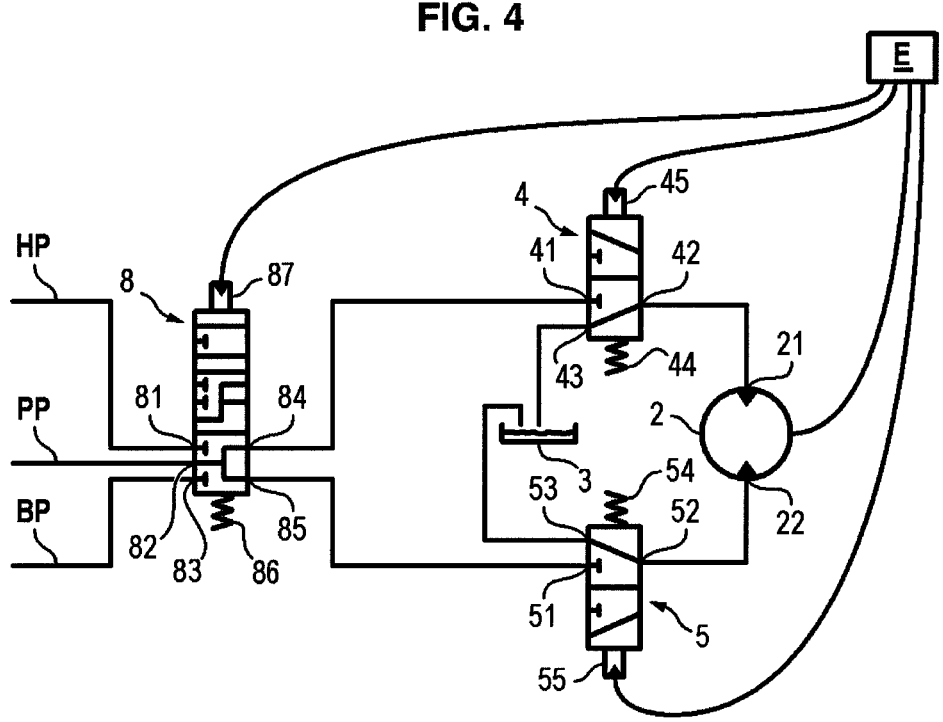

FIG. 4 shows a variant of the circuit shown in FIG. 3, wherein the distributor 8 exhibits a third intermediate configuration between the two configurations shown with reference to FIG. 3, wherein the first and second ports 81 and 82 of the intake distributor 8 are blocked, while the third port 83 is connected to the fourth and fifth ports 84 and 85.

Thus a progressive transition is defined by first connecting the two ports 21 and 22 of the hydraulic motor 2 to the control line PP, then to the low pressure line BP, before connecting its intake to the high pressure line HP, that is to say by sequentially connecting the ports 21 and 22 of the hydraulic motor 2 to the control PP, low pressure BP and high pressure HP lines.

Figure 5:
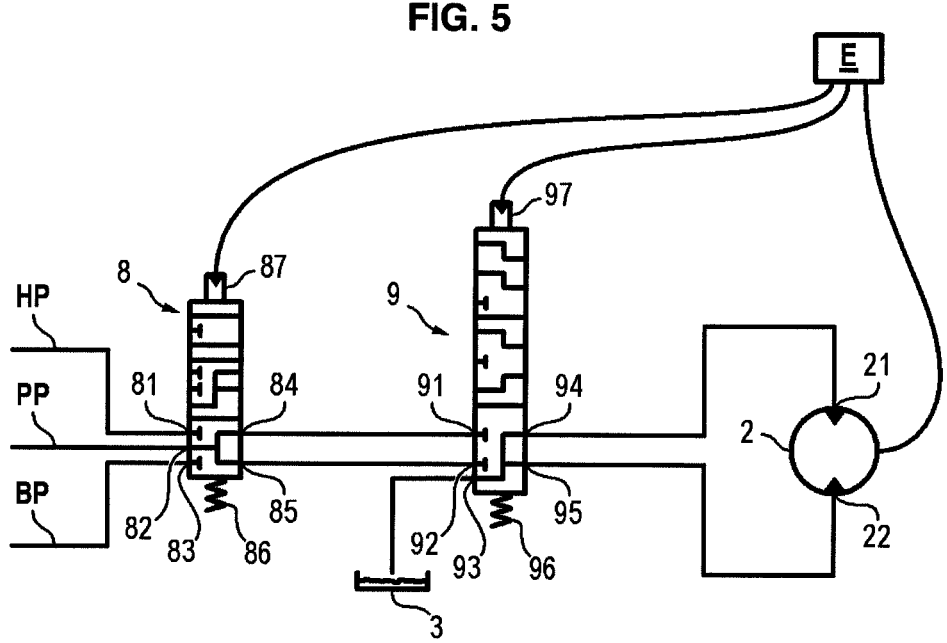

FIG. 5 illustrates a variant of the circuit shown in FIG. 4, wherein the distributors 4 and 5 are replaced by a single distributor 9 designed to perform the same function.

The distributor 9 as shown includes five ports, and alternates between three configurations due to the action of a control 97 opposed by an elastic return means 96.

The five ports 91, 92, 93, 94 and 95 are configured as follows:
the first port 91 is connected to the fourth port 84 of the distributor 8;
the second port 92 is connected to the fifth port 85 of the distributor 8;
the third port 93 is connected to the reservoir 3;
the fourth port 94 is connected to the intake 21 of the hydraulic motor 2;
the fifth port 95 is connected to the discharge 22 of the hydraulic motor 2.

The three configurations of the distributor 9 are as follows:
in a first configuration, the first 91 and second 92 ports are blocked, and the third port 93 is connected to the fourth 94 and fifth 95 ports;
in a second configuration, the first port 91 is connected to the fourth port 94, the second port 92 is blocked, and the third port 93 is connected to the fifth port 95;
in a third configuration, the first port is connected to the fourth port 94, the second port 92 is connected to the fifth port 95 and the third port 93 is blocked.

Thus, by flipping the distributor from the first configuration into the second configuration, an effect is obtained that is identical to the control of the distributor 4 shown in FIG. 3. Then, by flipping the distributor 9 from the second into the third configuration, an effect is obtained that is identical to the control of the distributor 5 shown in FIG. 3.

This variant is advantageous in terms of bulk; the use of a single distributor 9 instead of the two distributors 4 and 5 makes it possible to obtain a reduced volume, and thus to facilitate its integration.

Figure 6:
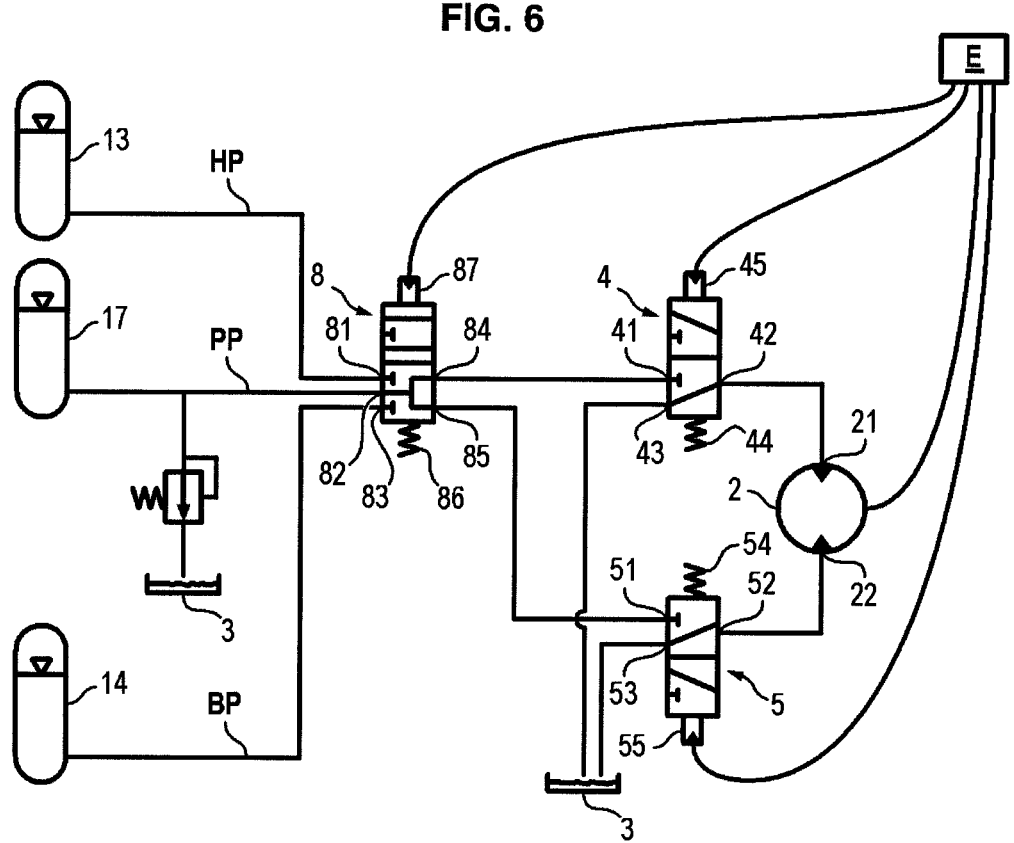

FIG. 6 illustrates a variant of the circuit shown in FIG. 3, wherein the high pressure HP, low pressure BP and control PP lines are respectively fed by a high pressure accumulator 13, a low pressure accumulator 14 and a control accumulator 17.

The operation of this variant is identical to the operation of the variant shown in FIG. 2; the function of feeding with pressure being provided here by the accumulators 13, 14 and 17.

The terminology of "high pressure" and "low pressure" accumulators refers to the function of these accumulators; the high pressure accumulator being designed to supply the hydraulic motor 2 during its operation as a motor, and to be charged by the latter during its operation as a pump as described hereafter.

The use of accumulators to accomplish the feeding of pressure to the hydraulic motor 2 makes it possible to construct a so-called "regen" circuit, making it possible to recover energy during braking, and to restore it during acceleration. Moreover, the circuits with accumulators exhibit the same problems as the closed loop circuits with a hydraulic pump, which is the will to obtain a silent coupling of the pistons that does not damage the motor. The invention also makes it possible to respond to these problems for circuits equipped with accumulators.

The operation of such a "regen" circuit is described with reference to FIG. 6.

During an acceleration requiring hydraulic assistance, the hydraulic motor 2 must couple; firstly, then, the control accumulator 17 is successively connected to the intake 21 of the hydraulic motor 2, then to its discharge 22 in order to accomplish controlled coupling as previously described.

Once this coupling is accomplished, the intake 21 and the discharge 22 of the hydraulic motor 2 respectively to the high pressure accumulator 13 and to the low pressure accumulator 14.

The hydraulic motor 2 is then fed by the high pressure accumulator 13, and fills the low pressure accumulator 14.

During braking, the hydraulic motor 2 is also coupled, but it then operates as a pump; it draws fluid from the low pressure accumulator 14 and charges the high pressure accumulator 13.

It will be clearly understood braking thus makes it possible to accumulate fluid in the high pressure accumulator 13, and thus to charge it so as to use this charge during subsequent acceleration phases.

The control accumulator 17 is advantageously selected so that its volume is sufficient to ensure the emergence of all the pistons 27 from their cavity 26 with sufficient pressure, that is to say to give a delivery compatible with the predetermined maximum speed of the vehicle for a coupling operation.

Figure 7:
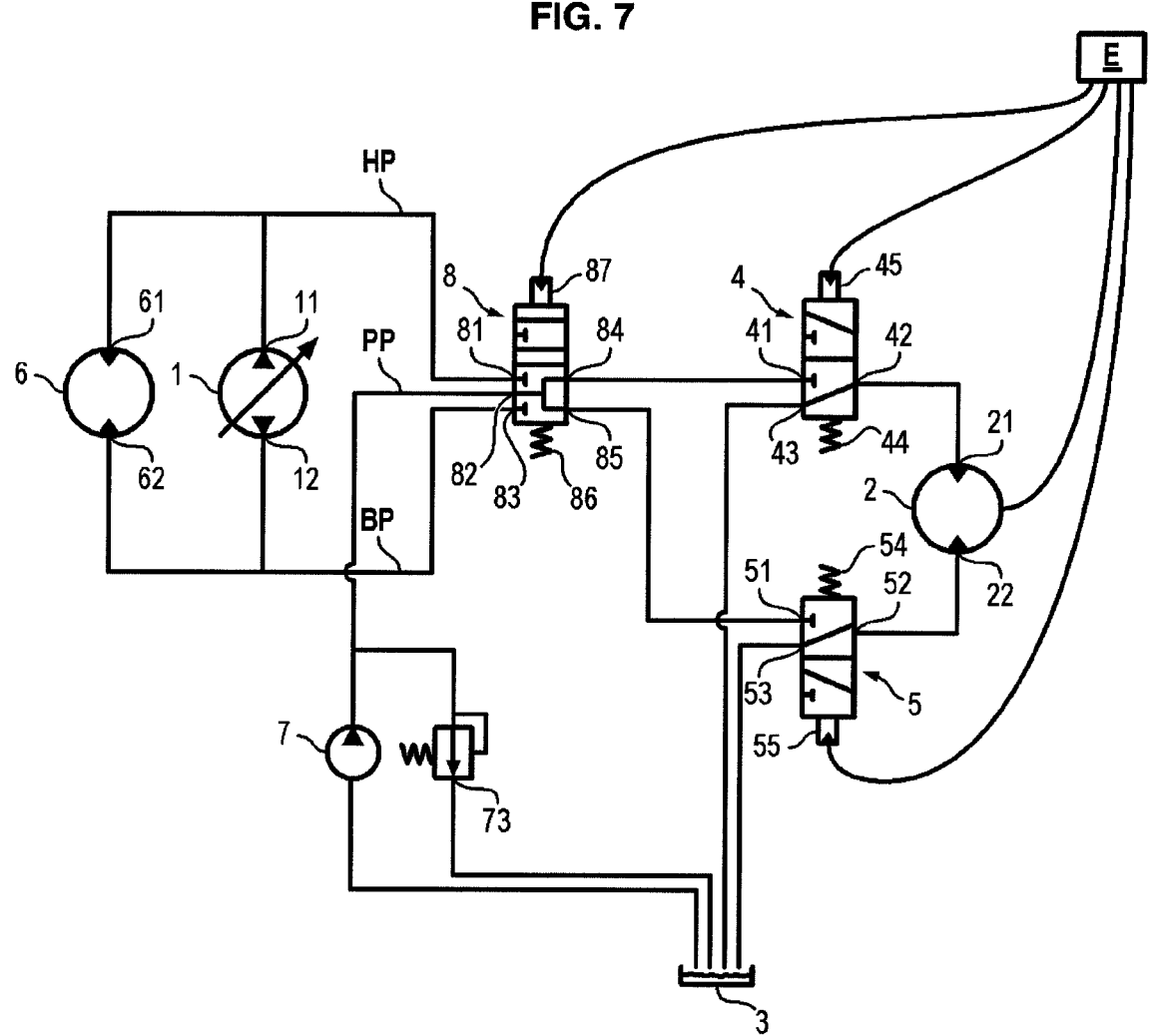

FIG. 7 illustrates a variant of the circuit shown in FIGS. 3 and 6, wherein the high pressure HP, low pressure BP and control PP lines are connected to hydraulic pumps.

In this variant, the high pressure HP and low pressure BP lines are respectively connected to the discharge 11 and to the intake 12 of a hydraulic pump 1.

In the variant shown, the hydraulic pump 1 supplies a second hydraulic motor 6, similar to the hydraulic motor 2 shown previously and thus exhibiting two ports, respectively 61 and 62, connected respectively to the first and to the second port 11 and 12 of the hydraulic pump 1.

By way of an example, the second hydraulic motor 6 corresponds typically to the main transmission of the vehicle, while the first hydraulic motor 2 or to the typically corresponds to the auxiliary transmission or to the transmission assistance.

The control line PP is connected to the control pump 7, and is equipped with a relief valve 73 allowing its delivery to be spilled into the reservoir 3 in the event of excessive pressure in the control line PP. This control pump 7 is for example the booster pump of a hydraulic circuit providing the boost for said circuit.

The operation is similar to that previously described with reference to FIGS. 3 and 6; coupling of the hydraulic motor 2 is accomplished by means of the pressure in the control line PP, resulting here from the delivery fed by the control pump 7, before connecting the hydraulic motor to the hydraulic pump 1.

It is of course clearly understood that it is also possible to contemplate such a variant with hydraulic pumps in the circuits shown in FIGS. 4 and 5.

Figure 8:
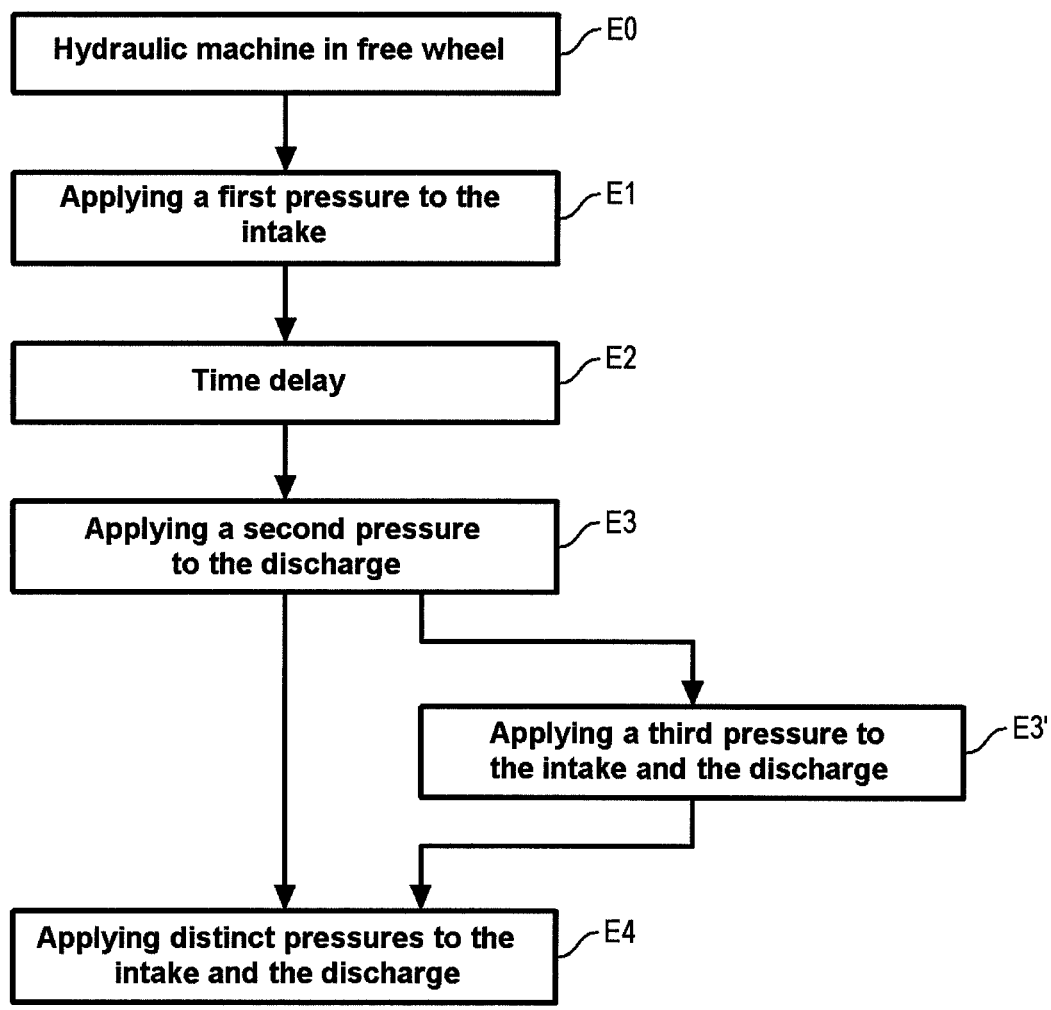
FIG. 8 shows schematically a method according to one aspect of the invention.

FIG. 8 is a schematic view of a method according to one aspect of the invention.

Step E0 corresponds to the initial state of the system, which is in the free wheel configuration as described previously, that is to say that the hydraulic machine has its discharge and its intake connected to a reservoir at ambient or atmospheric pressure and that its pistons are retracted into its cavities so as not to come into contact with the cam.

In a first step E1, a first pressure greater than said ambient pressure, typically a control pressure PP, is applied to the intake of the hydraulic machine, as described with reference to the foregoing examples. Following this first connection of step E1, a time delay is performed during a step E2, said time delay being designed so that the rotating portion of the hydraulic machine performs a portion of a revolution allowing all the pistons to emerge from their cavities due to this application of a first pressure to the intake of the hydraulic machine.

Finally, during a step E3, a second pressure is applied to the discharge of the hydraulic machine.

As was described with reference to the foregoing figures, the pressure source to which the intake of the hydraulic machine is connected during the step E1 and the pressure source to which the discharge of the hydraulic machine is connected during the step E3 can be identical or distinct.

In the case where these pressure sources are identical, the method can include a later step E4 consisting of applying distinct pressures to the intake and the discharge of the hydraulic machine, typically by connecting them to the discharge and to the intake of a hydraulic pump, or to high and low pressure accumulators as described previously with reference to FIGS. 3, 6 and 7.

Furthermore, as was described with reference to FIGS. 4 and 5, when the first and second pressures are identical the method can include a supplementary step E3' between the steps E3 and E4, during which a third pressure, greater than said first pressure, is applied to the intake and the discharge of the hydraulic machine.

As described with reference to FIGS. 4 and 5, this corresponds for example to applying the pressure of the low pressure line BP to the intake and the discharge of the hydraulic motor, following the initial successive applications of the pressure of the control line PP to the intake and to the discharge of the hydraulic motor, before connecting its intake to the high pressure line HP.

This additional step makes it possible to safeguard the contacting of the pistons with the cam under higher speed conditions.

The invention claimed is:

1. A hydraulic circuit including:
   a high pressure line (HP) and a low pressure line (BP), the pressure in said high pressure line (HP) being greater than the pressure in said low pressure line (BP),
   a hydraulic machine (2) having two ports (21, 22) designed to be connected to said high pressure (HP) and low pressure (BP) lines, a first (21) of said ports being a hydraulic fluid intake port and the second (22) of said ports being a hydraulic fluid discharge port,
   wherein said circuit also includes a control line (PP), the pressure whereof is lower than the pressure in the lower pressure line (BP), and sequential connection means (4, 5, 8, 9) comprising at least one distributor (4, 9) designed for, during a first movement, connecting the intake (21) of the hydraulic machine to the control line (PP), during a second movement, connecting the discharge (22) of said hydraulic machine to the control line (PP), and, during a third movement, connecting the discharge (22) of said hydraulic machine (2) to the low pressure line (BP) and the intake (21) of the hydraulic machine (2) to the high pressure line (HP).

2. The circuit according to claim 1, also including a reservoir (3) at ambient pressure, wherein said connection means (4, 5, 8, 9) include at least one selector valve designed to selectively connect said intake (21) and discharge (22) ports of said hydraulic machine (2)
   to the high pressure (HP) and low pressure (BP) lines,
   to the reservoir (3).

3. The circuit according to claim 1, wherein said high pressure (HP) and low pressure (BP) lines are connected respectively to the discharge and to the intake of a hydraulic pump (1) and the control line (PP) is fed by a control pump (7), said connection means including
   connection means (4, 5, 9) of the hydraulic machine, and
   an intake distributor (8),
   the intake distributor (8) being designed to selectively connect the control pump (7) or the intake and the discharge of the hydraulic pump (1) to the connection means of the hydraulic machine,
   said connection means of the hydraulic machine (4, 5, 9) being designed to selectively connect the intake (21) and the discharge (22) of said hydraulic machine (2) to the intake distributor (8) or to a reservoir (3) at ambient pressure.

4. The circuit according to claim 3, wherein said high pressure line (HP) is connected to a high pressure accumulator (13) and said low pressure line (BP) is connected to a low pressure accumulator (14), and the control line (PP) is fed by a control accumulator (17), said connection means including
   connection means (4, 5, 9) of the hydraulic machine, and
   an intake distributor (8),
   the intake distributor (8) being designed to selectively connect said high pressure (13) and low pressure (14) accumulators or the control accumulator (17) to the connection means (4, 5, 9) of the hydraulic machine,
   said connection means (4, 5, 9) being designed to selectively connect the intake (21) and the discharge (22) of said hydraulic machine (2) of the hydraulic machine to the intake distributor (8) or to a reservoir (3) at ambient pressure.

5. The circuit according to claim 3, wherein said connection means of the hydraulic machine include a first (4) and a second (5) distributor,
   said first distributor (4) being designed for, in a first configuration, connecting the intake (21) of the hydraulic machine (2) to a reservoir (3) at ambient pressure and, in a second configuration, for connecting the intake (21) of the hydraulic machine (2) to the intake distributor (8),
   said second distributor (5) being designed for, in a first configuration, connecting the discharge (22) of the hydraulic machine (2) to a reservoir (3) at ambient pressure and, in a second configuration, for connecting the discharge (22) of the hydraulic machine (2) to the intake distributor (8).

6. The hydraulic circuit according to claim 3, wherein said connection means include a distributor (9) designed,
   in a first configuration, to connect the intake (21) and the discharge (22) of said hydraulic machine (2) to a reservoir (3) at ambient pressure,
   in a second configuration, to connect the intake (21) of said hydraulic machine (2) to the intake distributor (8), and the discharge (22) of said hydraulic machine (2) to a reservoir (3) at ambient pressure,
   in a third configuration, to connect the intake (21) of said hydraulic machine (2) to the intake distributor (8) and the discharge (22) of said hydraulic machine (2) to said intake distributor (8).

7. A control method for a radial piston hydraulic machine, said method including the following steps:
   applying a first pressure to the intake (E1) of the hydraulic machine, while the discharge of the hydraulic machine is connected to a reservoir (3) at ambient pressure,
   executing a time delay (E2) corresponding to a portion of a revolution of said hydraulic machine,
   applying a second pressure, less than or equal to said first pressure, to the discharge (E3) of the hydraulic machine,
   applying distinct pressures (E4) to the intake and the discharge of the hydraulic machine.

8. The method according to claim 7, wherein, for a hydraulic machine including a rotor and a cam having n peaks, said time delay is designed to allow the emergence of all the pistons from their cavities.

* * * * *